June 14, 1960 K. N. FROMM ET AL 2,941,033

FLAT-COPY SCANNER

Filed Dec. 30, 1955 2 Sheets-Sheet 1

INVENTORS.
KENNETH N. FROMM
NEAL A. BLAKE
BY
George A. Gust
ATTORNEY

INVENTORS.
KENNETH N. FROMM
NEAL A. BLAKE
BY
George A. Gust
ATTORNEY

United States Patent Office 2,941,033
Patented June 14, 1960

2,941,033

FLAT-COPY SCANNER

Kenneth N. Fromm and Neal A. Blake, Fort Wayne, Ind., assignors to International Telephone and Telegraph Corporation Filed Dec. 30, 1955, Ser. No. 556,686
5 Claims. (Cl. 178—7.1)

This invention relates to facsimile or flat-copy scanners and is particularly directed to mechanisms for reading pages of printed material.

Rotating disks with light apertures have been used for scanning copy for facsimile-type transmission, the aperture scanning across the page or sheet along successively closely spaced scan lines. At best, rotating disks for scanning are inaccurate when presently known construction techniques are employed. Apertures on a rotating disk must travel in arcuate paths across the copy, and hence limits the size of the page which can be scanned for a given disk diameter. Apertures carried on an endless tape can be moved in straight lines but heretofore there has been no known method of accurately controlling the speed of the tape. If the tape is keyed to the driving rollers by sprocket teeth, as in motion picture projectors, the teeth soon wear the sprocket holes in the tape permitting the tape to shift slightly. Further, the sprocket teeth produce jitter or vibration in the tape and in the light aperture which reduces resolution.

The object of this invention is an improved facsimile type reader for flat-copy scanners.

A more specific object of this invention is a flat-copy scanner which scans along straight lines, which is capable of scanning copy of large dimensions, which is free of jitter or vibration, and which is easily controlled in speed.

The objects of this invention are attained by means for moving the copy to be scanned across a light slot, the copy being driven by a first motor which also drives a tachometer for sampling the speed of the motor and the copy feed. An endless tape with a first series of holes moves lengthwise of the slot and is driven by a second motor. The tape has two series of holes, one series being spaced along the tape for scanning successive increments of the slot corresponding to a complete scan across the copy, and a second series of holes being of uniform distance apart from each other and from the side of the tape, a light source and photocell being disposed to sample the linear speed of the tape. A constant standard frequency source is compared with the tachometer frequency and with the photocell frequency to obtain two error signals, respectively, of any shift in phase or speed of either motor from said standard frequency. The two error signals are applied, respectively, to the copy driven motor and to the tape driven motor.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
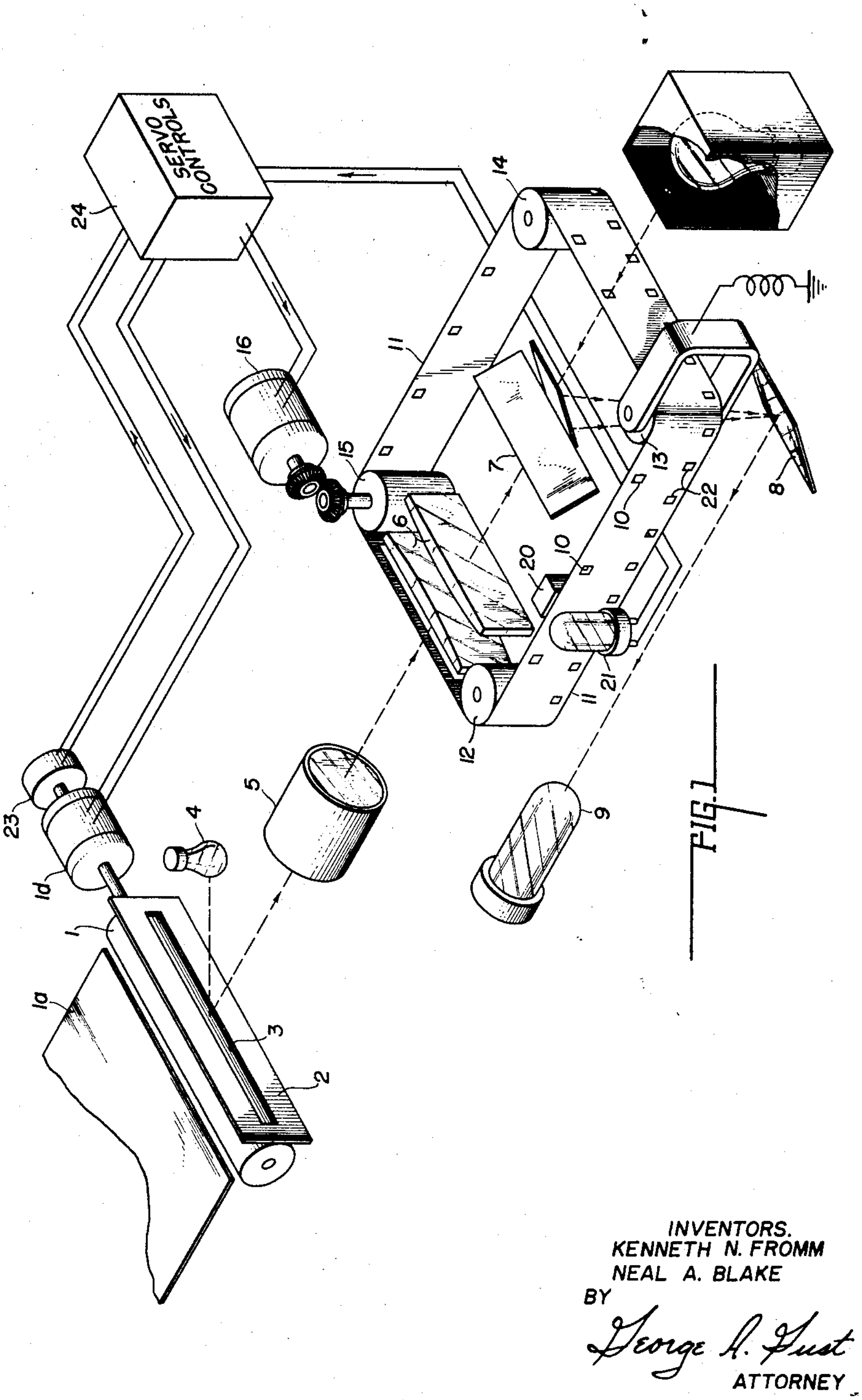
Fig. 1 is a perspective view of the principal elements of the scanner of this invention.

Sheets of paper, pictures, maps, or other copy to be scanned for facsimile-type transmission is fed from table 1*a* over roller 1 and between the roller and the plate 2 with slot 3 for continuously vertically scanning the copy thus fed. A complete line across the copy is illuminated by light source 4 and the image of the entire line is projected through focusing lens 5 and through condensing lens system 6 to mirrors 7 and 8, and hence to photomultiplier 9. The output of photomultiplier 9 is amplified, aplied to a carrier, and transmitted via radio or wire lines as desired.

The information along one horizontal line, seen through slot 3, is scanned lengthwise of the slot by apertures 10 in tape 11. Tape 11 in the embodiment shown is endless and travels over four pulleys 12, 13, 14 and 15. Pulley 15 is geared, as shown, to motor 16. The distance between apertures 10 is selected so that one window at a time optically travels the length of the slot 3.

It is to be noted that drive pulley 15, as well as idler pulleys 12, 13 and 14, are smooth and present no vibration-producing forces to the tape while in operation, as would be the case if sprocket teeth had been used. According to an important feature of this invention, the speed of the tape 11, and of the feed roller 1, is controlled by a servo system responsive to the linear speed of the tape and of the copy, respectively. The speed of the tape is sampled by an optical system comprising lighthouse 20 and photocell 21 placed on opposite sides of the tape and in optical alignment through the perforations 22 evenly spaced along one edge of the tape. The speed of motor 1*d* for driving copy feed roll 1 is sampled by the tachometer 23 driven directly by the motor. The tachometer 23 may be any of the commercially available types which will produce, preferably, a sinewave output whose amplitude is proportional to the shaft speed of the tachometer. The sampled speeds at the terminals of photocell 21 and at the terminals of tachometer 23 are applied to the servo control systems generally indicated at 24. The output lines of the servo control 24 contain control signals which are used to change the speeds of the motors in such a manner as to cancel out any differences between a fixed standard frequency source within the servo system and the two sampled frequencies, respectively.

Figure 2:
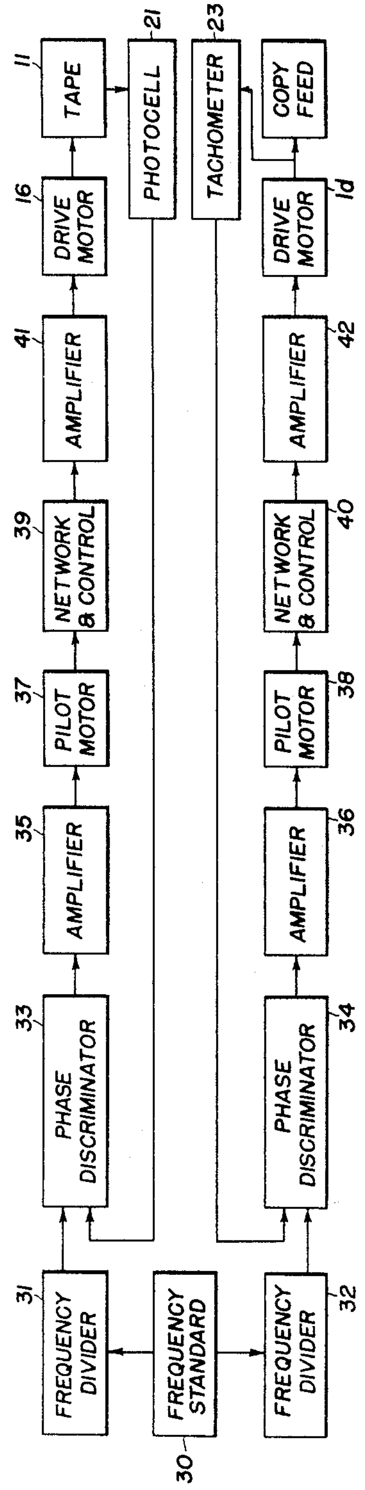
Fig. 2 is a block diagram of the electric circuits of the system of Fig. 1.

The servo system 24 is shown in expanded detail in Fig. 2. The photocell 21 receives optical signals from the perforations in tape 11, as explained, while tachometer 23 generates a frequency proportional to its driven motor 1*d*. The outputs of photocell 21 and tachometer 23 are compared with the frequency of the standard frequency source 30. The standard frequency source 30 may comprise a temperature-controlled tuning fork or a piezoelectric crystal system. Inasmuch as the more reliable standard frequency generators operate in a frequency range much higher than the speeds and frequencies obtainable with a mechanical system of the type described, the output of the frequency standard is divided down to the lower frequency used in the system by frequency dividers 31 and 32. The tuning fork frequency of 1800 cycles per second, for example, is conveniently sub-divided to 900 c.p.s., 450 c.p.s. and 225 c.p.s. It has been found that a standard frequency of 900 c.p.s. combines well with sampled frequencies of a tape driven at a speed corresponding to 120 lines per minute. Consequently, it will be necessary to divide the master frequency of 1800 cycles per second by a factor of two in one embodiment. It is especially easy to perform a frequency division of a wave that is a reasonably pure sinewave.

It has been found that a good sinewave can be produced at the terminals of photocell 21 when the windows 22 are rectangular and when the light beam emitted by lighthouse 20 is round in cross-section and is smaller in diameter than the height of the window. The two sinewaves, of photocell 21 and frequency divider 31, are compared in the phase discriminator 33. Likewise, the sinewave output of tachometer 23 is compared with the the output of the frequency divider output 32 in phase discriminator 34. When the standard frequency of source 30 is identical in phase and frequency with the two sampling sources, the outputs of the discriminators 33 and 34 are zero. If one sample frequency drifts from the standard, the output of discriminators becomes analogous in polarity and amplitude to the error or drift. The error signals are amplified in amplifiers 35 and 36 and applied to drive pilot motors 37 and 38, respectively. The pilot motors drive wipers on potentiometers, to be described below, for producing direct current voltages proportional to the error signals and of appropriate polarity, these voltages being amplified at 41 and 42 and applied to drive motors 16 and 1*d*, respectively. These two drive motors will increase or decrease their speed in response to the error signal to return the driven speed of the copy to be scanned and of the scanning tape 11 to the speeds dictated by the frequency standard 30.

Figure 3:
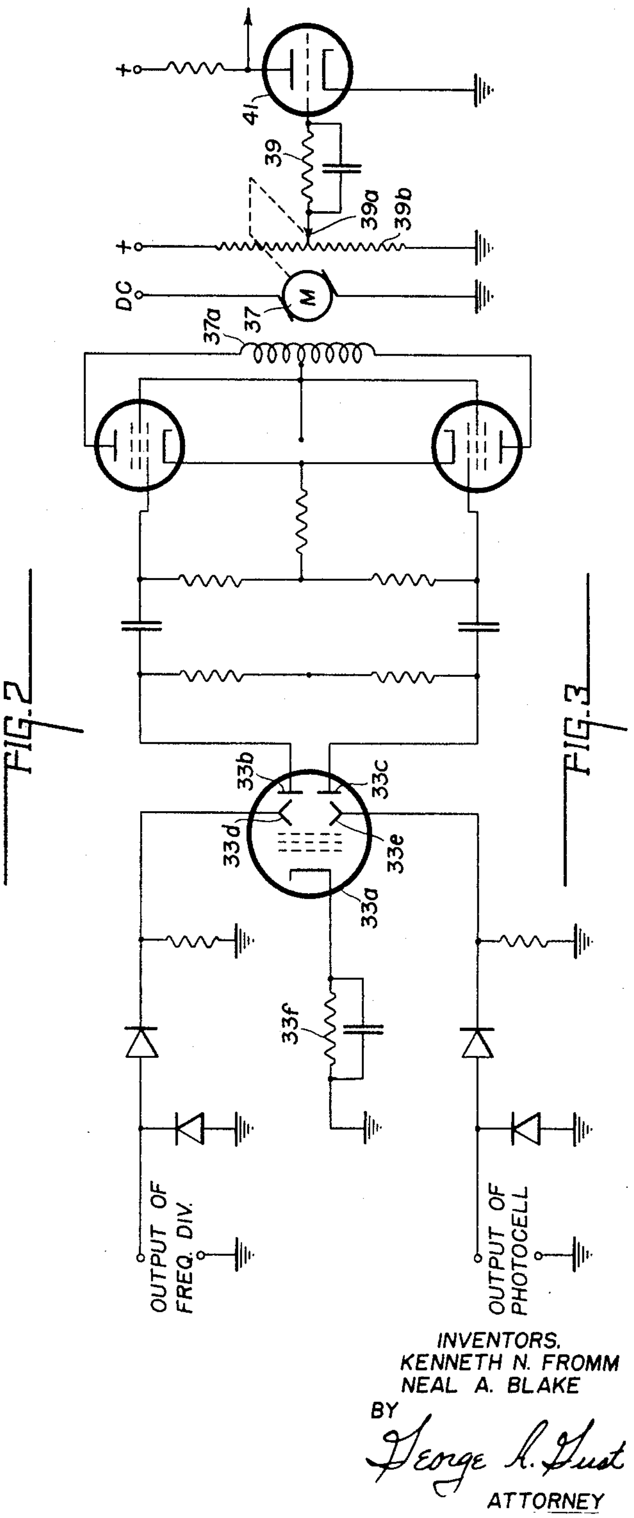
Fig. 3 is a circuit diagram of the phase discriminator and motor speed control for the system of Fig. 2.

One phase discriminator which can be used in the servo system of Fig. 2 is shown in Fig. 3. Tube 33*a* is of the type in which a sheet beam is deflected between two anodes 33*b* and 33*c*. The output of the frequency divider is applied to one deflection electrode 33*d* and the output of the photocell is applied to the other deflector electrode 33*e*. When the two signals are at the same frequency and are in phase, the output of the discriminator tube 33*a* will be zero, and hence there will be no resultant signal to the field 37*a* of pilot motor 37. At this point the average current through the tube 33*a* is at a minimum, thus the bias produced by a resistor 33*f* is at a minimum and the sensitivity of the tube is at a maximum. This maximum sensitivity at low error signals is advantageous in such servo loop since it permits a maximum gain around the null point where high gain is most desired. The amplitude and sign of the output of the phase discriminator controls the strength and polarity of the field 37*a* of the pilot motor. The field will thus produce a clockwise or counterclockwise rotation of the pilot motor armature in response to lagging or leading photocell current with respect to the standard frequency. The armature of motor 37 drives the control arm 39*a* of the precision potentiometer 39*b* so as to place more or less voltage on the grid of amplifier 41. The compensating network 39 is inserted between the amplifier and the potentiometer for purposes of integrating the signals and stabilizing the loop. This network is desirable since the open loop transfers function of the servo system contains a cubic factor in the denominator and will be unstable above a certain value of gain in the forward loop unless the network is added. The output of amplifier 41 is applied directly to the armature winding of motor 16.

The phase discriminator 34 in the drive motor circuit for the copy feed may be identical to the phase discriminator 33, just described.

Since the scanning tape 11 (Fig. 1) is driven by a direct current motor through a smoth drive linkage, objectionable noise-producing vibrations in the tape are effectively eliminated. Further, since the tape can easily be adjusted for any length of scan line, wide copy can be read. Maps eighteen or more inches across can easily be scanned with the copy scanner of this invention.

While we have described above the principles of our invention in connection with specific apparatus, it is to be clearly understood that this description is made only by way of example and not as a limitation to the scope of our invention.

What is claimed is:

1. In facsimile systems, means for moving copy across a light slot, a first motor for driving the copy moving means, a tachometer for sampling the speed of said first motor, an endless tape with a first series of holes for scanning said slot, a motor for driving said tape, said tape having a second series of holes of uniform distance apart from each other and from the side of the tape, a light source and photocell cooperating with said second series of holes to sample the speed of the tape, a constant standard frequency source, means for comparing the frequency of said source with the tachometer frequency and with the photocell frequency, and means for applying the two error signals resulting from the two comparisons, respectively, to said first motor and the second motor.

2. In a flat copy scanner, an endless tape having a first series of evenly spaced light apertures for scanning said copy, means for regulating the speed of said tape, said means comprising a second series of light apertures evenly spaced along said tape, a source of light, a source of standard frequency waves, a photoelectric cell disposed to respond to said beam transmitted through said second series of apertures, and means for comparing the frequency of the output of said photocell and of said standard frequency source.

3. In combination, in a flat copy scanning system, a copy-feed roller for advancing the copy to be scanned across a plate, said plate having an elongated slot, a light source for exposing a line element of said copy through said slot, a first motor for driving said roller and advancing the copy across said slot, an endless tape with staggered apertures for moving lengthwise of said slot and scanning the exposed portion of said copy in said slot and with evenly spaced light holes; a second motor for driving said tape, a tachometer driven by the first motor, a photoelectric system responsive to light from said holes for producing electric signals analogous to tape speed; a standard frequency source, means including a first phase discriminator responsive to said standard frequency source and to said tachometer for controlling said first motor and means including a second phase discriminator responsive to said standard frequency source and to said photoelectric system for controlling the speed of said second motor.

4. The system defined in claim 3 further comprising frequency dividers connected, respectively, between said standard frequency source and the two mentioned phase discriminators, respectively.

5. In a flat copy scanner, an endless tape having a first series of evenly spaced light apertures for scanning said copy, means for regulating the speed of said tape, said means comprising a second series of light apertures evenly spaced along said tape, a source of light, means for restricting the light of the source to a beam that is round in cross-section and of smaller diameter than the transverse dimension of said second series of apertures, a source of standard frequency of waves of sinusoidal form, a photoelectric cell disposed to respond to said beam transmitted through said second series of apertures, and means for comparing the frequency of the output of said photocell and of said standard frequency source.

References Cited in the file of this patent

UNITED STATES PATENTS

| | | |
|---|---|---|
| 1,648,687 | Hoxie | Nov. 8, 1927 |
| 2,268,496 | Cooley et al. | Dec. 30, 1941 |
| 2,281,954 | Rinia | May 5, 1942 |
| 2,471,916 | Volz | May 31, 1949 |
| 2,627,596 | Andrews | Feb. 3, 1953 |
| 2,715,202 | Turner | Aug. 9, 1955 |
| 2,769,949 | Stratton | Nov. 6, 1956 |